US005528032A

United States Patent [19]

Uchiyama

[11] Patent Number: 5,528,032

[45] Date of Patent: Jun. 18, 1996

[54] THERMAL DESORPTION GAS SPECTROMETER

[75] Inventor: Taizo Uchiyama, Hachioji, Japan

[73] Assignee: Esco Ltd, Tokyo, Japan

[21] Appl. No.: 210,761

[22] Filed: Mar. 22, 1994

[30] Foreign Application Priority Data

Mar. 23, 1993 [JP] Japan .................................... 5-064196

[51] Int. Cl.[6] .............................. H01J 49/00; B01D 59/44

[52] U.S. Cl. ......................... 250/288; 250/281; 250/443.1

[58] Field of Search ..................................... 250/281, 288, 250/443.1

[56] References Cited

U.S. PATENT DOCUMENTS 4,663,297 5/1987 Yates et al. ............................. 436/147
4,877,584 10/1989 Yates et al. ............................... 422/88

OTHER PUBLICATIONS

Yuko Hirohata, "Characterization Of Gas Desorption From Solid Samples With Small Size by TDS", Faculty of Engineering, Hokkaido University, 1990, pp. 34–41, English Translation of Section 3.

N. Hirashita et al, "Studies Of Quantitative Analysis Of Evolved Gas Using Thermal Desorption Spectroscopy", Abstracts of the Japanese Society of Applied Physics, 1993, Full English Translation.

Takahagi, "Evaluation of Hydrogen–Terminated SI Surface", EFM–92–37, 1992, pp. 31–40, English Trans. of Section 2.2.

English Abstract of Japan Application No. 4–48254 of Hinaga for Device and Method for Detecting Desorbed Gas Feb. 1992.

*Primary Examiner*—Bruce C. Anderson
*Attorney, Agent, or Firm*—Cushman, Darby & Cushman

[57] ABSTRACT

In a thermal desorption gas spectrometer in which samples placed on a sample stage within a vacuum chamber are heated by irradiation with infrared rays, and in which mass is analyzed by detecting desorbed gas by means of a mass spectrometer, there is provided a processing circuit which takes in the electrical signal that is output by the mass spectrometer. The intensity of this signal is continuously recorded, for each mass of a detected substance, as a function of temperature (or of elapsed time) from the start of heating of the sample to the temperature at which the amount of desorbed gas from the sample becomes extremely small. This signal intensity is integrated with respect to temperature (or time) for each mass. The absolute value of the number of molecules can be obtained by comparing these integrated values with the value obtained for a standard sample. A single reference can be set for these measurement results, and an absolute value can be given for the measurement results for each kind of gas that desorbs in the vacuum.

10 Claims, 7 Drawing Sheets

THERMAL DESORPTION GAS SPECTROMETER

INDUSTRIAL FIELD OF UTILIZATION

This invention is utilized for the testing of IC chips and other small and precise parts. This invention is used to evaluate the history of the production process of a sample under test, and on this basis to improve that production process. This is achieved by placing the sample to be tested in a high vacuum, capturing the extremely small quantity of desorbed gas that is released from the sample when it is heated, and then performing mass spectrometry on this gas.

PRIOR ART

In the production of semiconductor chips, the chips undergo numerous processes involving repeated vacuum evaporation, rinsing and treatment with chemicals. However, in order to improve the production yield, it is necessary to discover which steps of this production process should be improved and how such improvements should be made. A known technique for achieving this is to detect desorbed gas from semiconductor chips under production or from finished chips. To do this, parts under production or finished products (extracted in the course of the production process or at its end) are used as samples. These samples are placed in an extremely high vacuum and heated. When this is done, chemicals and other trace components remaining on the sample are released in the form of a gas. If this gas is captured within the vacuum and subjected to mass spectrometry, it is be possible to characterize its composition, which enables the influence of a given part of the production process to be evaluated.

The present applicant has previously applied for a patent on an invention which greatly improves devices for this purpose (see Japanese Patent Publication No. 448254). This improvement consists of a construction wherein a vacuum chamber with a metal cylinder for the outer shell is used perpendicularly for creating an extremely high vacuum; a sample stage is positioned near the centre of the vacuum chamber; and this sample stage is irradiated from below with infrared rays. A high-performance vacuum pump is used to maintain a high of vacuum throughout the test period, and this is operated continuously throughout the test period. At the same time, a mass spectrometer for detecting desorbed gas is placed in the exhaust passage through which the atmosphere within the vacuum chamber is introduced to the vacuum pump.

This device has gained an extremely good reputation, both in Japan and overseas, as a device which can measure low levels of gas which have hitherto been impossible to measure. Whilst performing repeated measurements using this device, the inventor noticed the following. Namely, when a sample is gradually heated from room temperature, although the amount of gas that desorbs from the sample first of all increases as the sample temperature rises, as the temperature is further raised, the amount of gas that desorbs gradually decreases until there is hardly any more desorbed gas. This is thought to mean that all the components which had adsorbed onto the sample had desorbed. Accordingly, if the signal intensity due to this gas (which is measured as temperature is raised) is plotted on a graph with temperature taken along the horizontal axis, the area enclosed by the plotted line will be proportional to the total amount of desorbed gas.

Now, it is known that if the surface of a silicon wafer is treated with hydrofluoric acid, a single layer of hydrogen molecules will be arranged on the surface of the silicon wafer (see T. Takahagi, "*Evaluation of hydrogen-terminated Si surfaces*", Papers of Technical Meeting on Electronic Materials, Institute of Electrical Engineers of Japan, EFM-92-37). This is equivalent to $7\times10^{14}$ hydrogen molecules per $cm^2$. If this desorption gas spectrometer is utilized for repeated measurements of samples comprising hydrofluoric acid surface-treated silicon wafers, the signal intensity measured will always be more or less uniform.

PURPOSE OF THE INVENTION

The purpose of this invention is to provide a desorption gas spectrometer with which, on the basis of the above-mentioned phenomenon, a single reference can be set for measurement results obtained using this sort of device, and with which the absolute value of measurement results can be given.

DISCLOSURE OF THE INVENTION

This invention is characterized in that, in a thermal desorption gas spectrometer equipped with a vacuum chamber, a vacuum pump which maintains this vacuum chamber at a vacuum, a sample stage which is positioned within this vacuum chamber, a heater which heats the sample that has been placed on this sample stage by irradiating it with infrared rays from below the sample stage, and a mass spectrometer which is positioned within the aforementioned vacuum chamber and which detects gas which desorbs from the aforementioned sample: there is provided a processing circuit which takes in the electrical signal that is output by the aforementioned mass spectrometer. The processing circuit is equipped with a means which continuously records, for each mass of a detected substance, the intensity of this signal as a function of temperature (or of elapsed time) from the start of heating of the aforementioned sample to the temperature at which the amount of desorbed gas from the sample becomes extremely small. This processing circuit is also equipped with a means which integrates this signal intensity with respect to temperature (or time) for each mass, and which expresses the integrated value in terms of a ratio to a reference value. This reference value corresponds to the aforementioned integrated value in the case of hydrogen molecules desorbing from a silicon wafer which has been surface-treated with hydrofluoric acid, and can be taken as $2\times7\times10^{14}/cm^2$. The aforementioned reference value can also correspond to the aforementioned integrated value which is proportional to the number of hydrogen molecules which desorb from a silicon wafer implanted with hydrogen ions.

The sample is placed on the sample stage within the vacuum chamber, the inside of the vacuum chamber is evacuated with a vacuum pump, and the sample that has been placed on the sample stage is heated by irradiating it from below the sample stage with infrared rays produced by a heater. A mass spectrometer detects the gas that desorbs from the sample as the result of this heating and outputs the resulting electrical signal to a processing circuit. The processing circuit takes in this electrical signal and continuously records its intensity for each mass of a detected substance, as a function of temperature (or of elapsed time) from the start of heating of the sample to the temperature at which the amount of desorbed gas from the sample becomes extremely small, and integrates this signal intensity with respect to temperature (or time) for each mass.

By this means, the signal intensity for each mass can be displayed graphically as a function of temperature (or of elapsed time) up to the point where hardly any more gas desorbs from the sample, and can be integrated. Using this integrated value, the number of desorbed gas molecules can be obtained from the proportionality to a standard sample (in this case, a hydrofluoric acid treated Si wafer).

EMBODIMENTS

Figure 1:
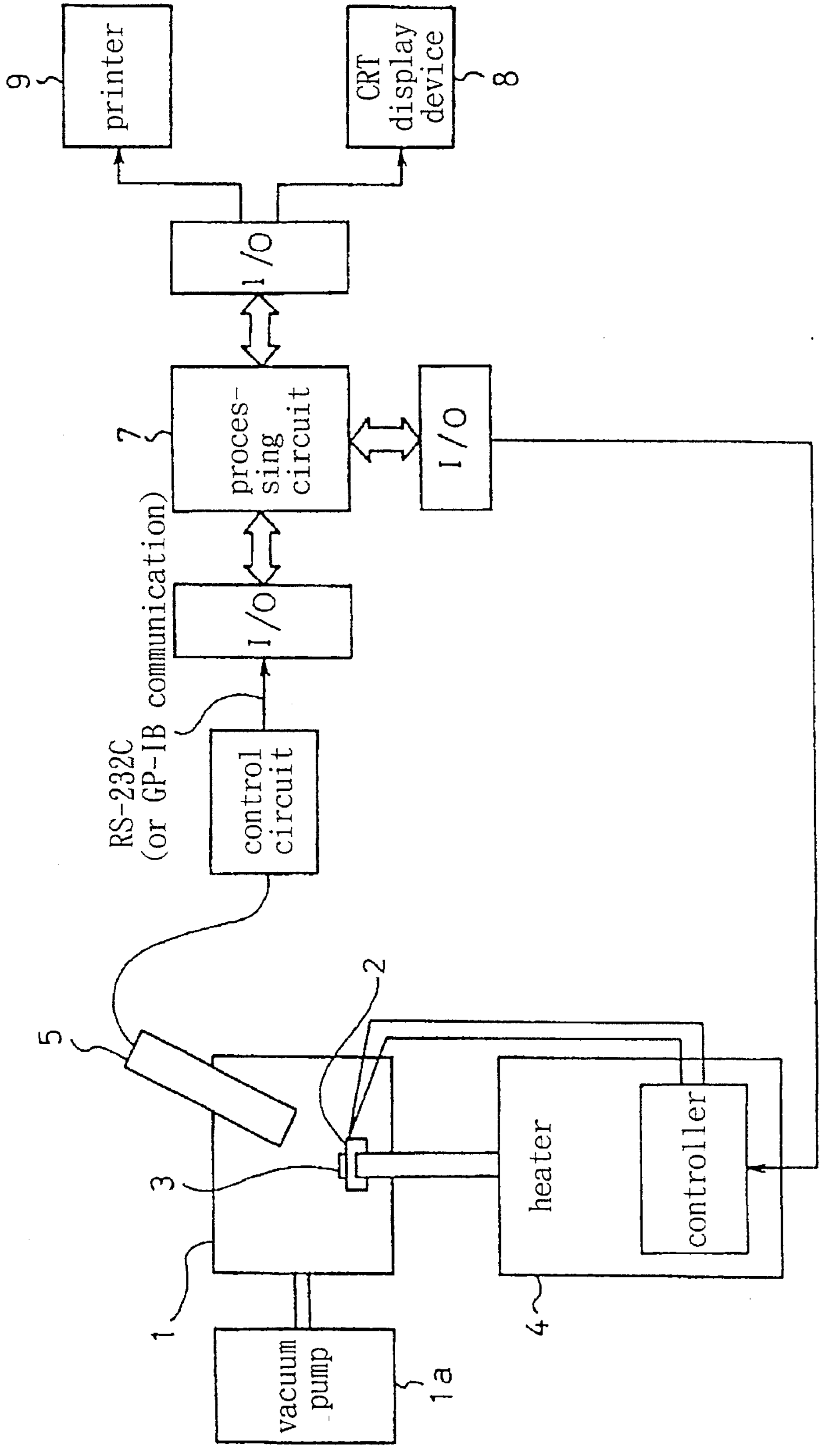
FIG. 1 is a block diagram showing the constitution of the main parts of a device embodying this invention.
Figure 2:
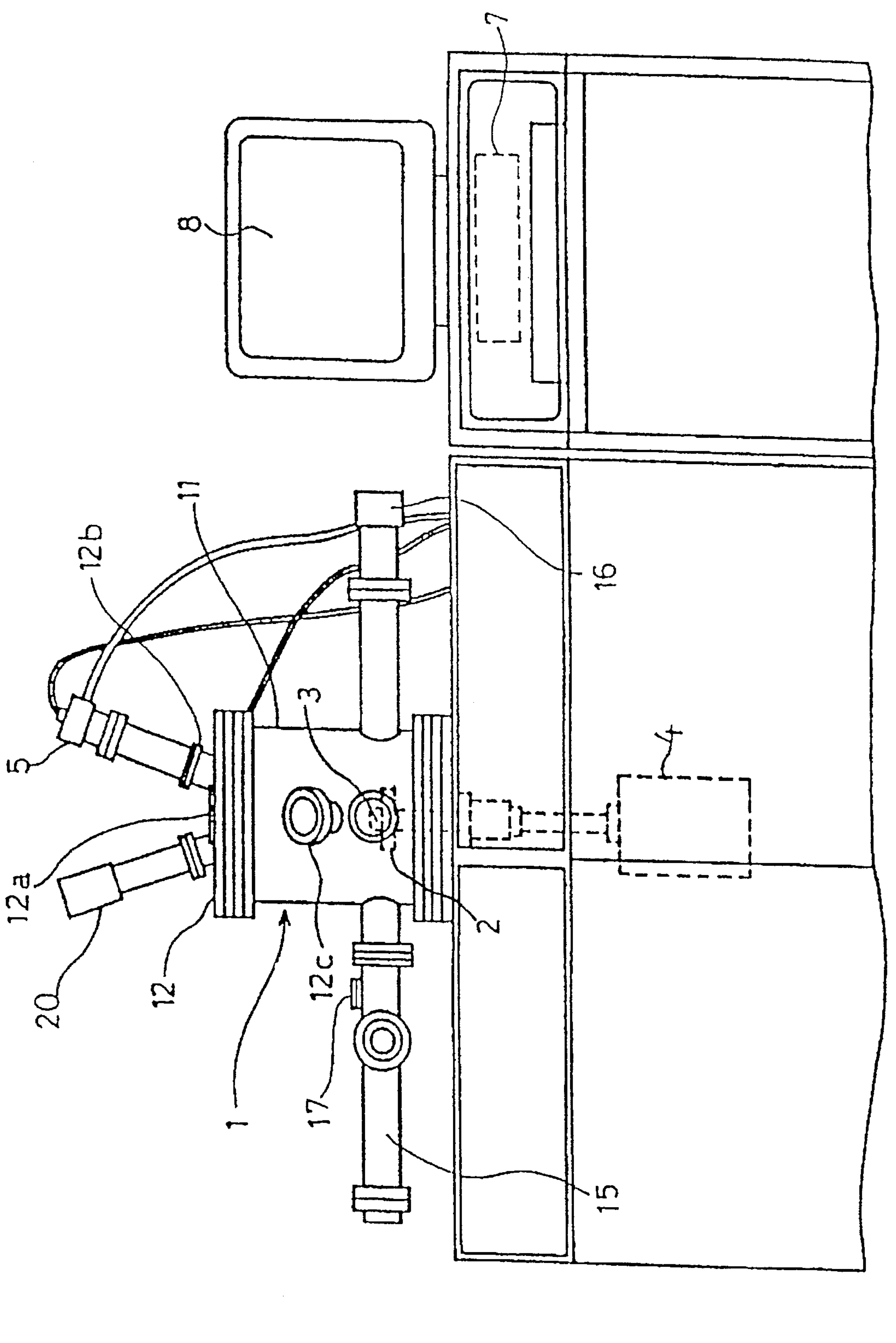
FIG. 2 is a front elevation showing the external shape and appearance of the overall device embodying this invention.
Figure 3:
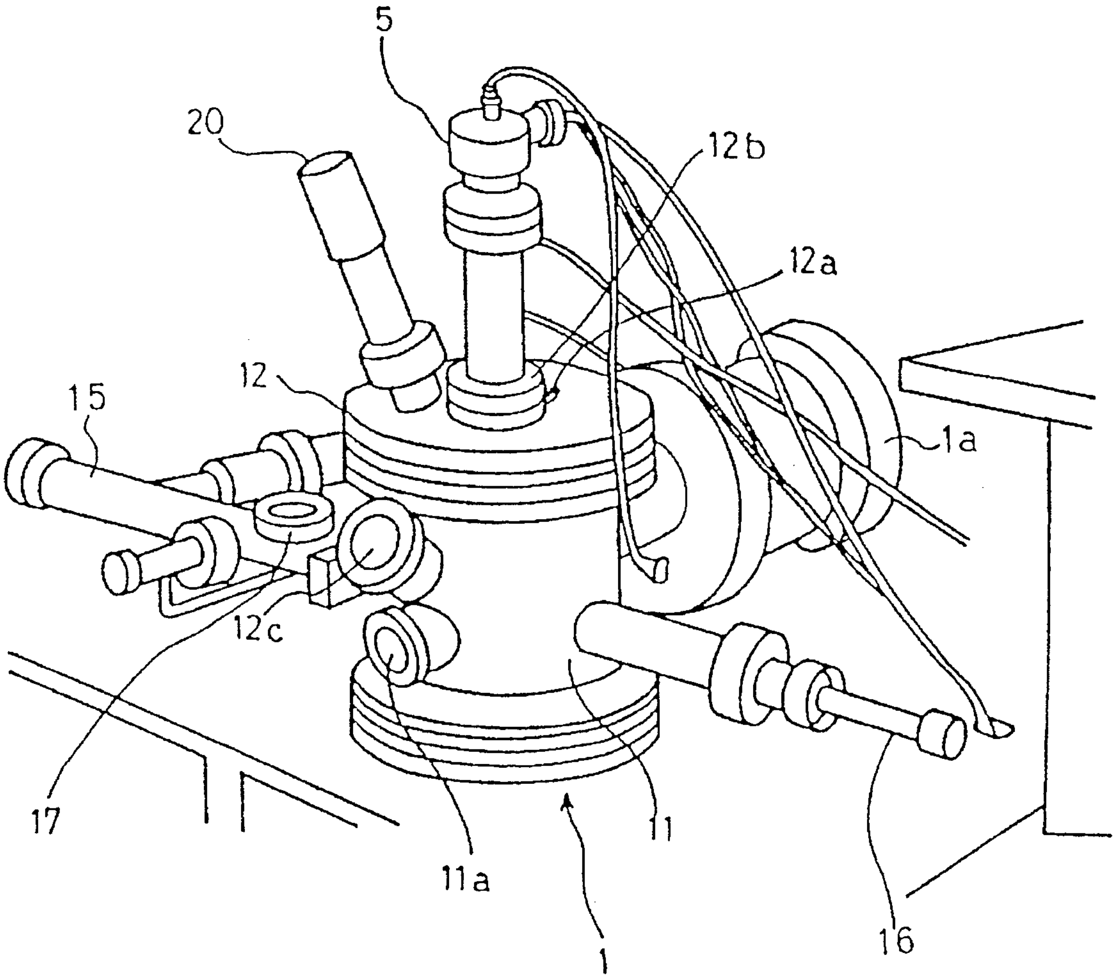
FIG. 3 is a perspective view showing the external shape and appearance of the main parts of a device embodying this invention.

Embodiments of this invention will now be explained on the basis of the drawings. FIG. 1 is a block diagram showing the constitution of the main parts of a device embodying this invention, FIG. 2 is a front elevation showing the external shape and appearance of the overall device embodying this invention, and FIG. 3 is a perspective view showing the external shape and appearance of the main parts of a device embodying this invention.

Embodiments of this invention are provided with vacuum chamber 1, vacuum pump 1*a* which maintains this vacuum chamber 1 under vacuum, sample stage 2 which is positioned within vacuum chamber 1, heater 4 which heats sample 3 placed on this sample stage 2 by means of irradiation with infrared rays from below said sample stage 2, and mass spectrometer 5 which is positioned within vacuum chamber 1 and which detects gas which desorbs from sample 3. In addition, as a distinguishing feature of this invention, embodiments are also provided with processing circuit 7 which takes in the electrical signal that is output by mass spectrometer 5. This processing circuit 7 is provided with: a means which continuously records, for each mass of a detected substance, the intensity of this signal as a function of temperature (or of elapsed time) from the start of heating of sample 3 up to the temperature at which the amount of desorbed gas from this sample 3 becomes extremely small; a means which integrates this signal intensity with respect to temperature (or time) for each of these masses; and a means which displays these integrated values on the screen of CRT display device 8, or which prints them out by means of printer 9, as a ratio to a reference value.

The aforementioned reference value is $2\times7\times10^{14}/cm_2$, which corresponds to the aforementioned integrated value in the case of hydrogen molecules desorbed from a silicon wafer which has been surface-treated with hydrofluoric acid. A more detailed explanation of this will be given subsequently.

The outer shell of vacuum chamber 1 includes a single metal cylinder 11, the center axis of which is arranged perpendicularly, and cover 12 which covers the upper end of this metal cylinder 11. The surface of sample stage 2 on which a sample is placed is designed to lie on the aforementioned center axis and to form a plane that is perpendicular to this center axis. Infrared ray window 12*a* is formed in the approximate center of cover 12 and allows infrared rays which pass through sample stage 2 to radiate to the outside of vacuum chamber 1. Mass spectrometer 5 is fitted to port 12*b* in cover 12, the port being positioned alongside infrared ray window 12*a*.

Port 12*c* is also fitted to metal cylinder 11 so that mass spectrometer 5 may be fitted from another direction relative to sample 3. A peep hole 11*a* is also fitted to metal cylinder 11. A plurality of ports to which this mass spectrometer 5 can be fitted, may be provided as required.

In FIG. 2 and FIG. 3, 15 is a load-lock chamber, 16 is a manipulator for sample transfer, 17 is a sample access port, and 20 is a temperature measuring device.

Sample analysis proceeds as follows. Sample 3 is transferred from load-lock chamber 15 (which has a gate valve) onto sample stage 2 inside vacuum chamber 1 (which has been maintained in an evacuated condition). After a sufficiently high degree of vacuum has been obtained, sample 3 on top of sample stage 2 is heated by irradiation with infrared rays from heater 4. Desorbed gas is released from heated sample 3. The molecules of this gas are introduced directly to the intake of mass spectrometer 5, whereupon, by being ionized, accelerated and passed through an electric field and a magnetic field, or through one or other of these, their mass numbers and the ion intensities corresponding to the mass numbers are measured. Since the working of this mass spectrometer 5 is well known, no detailed explanation will be given here.

Figure 4:
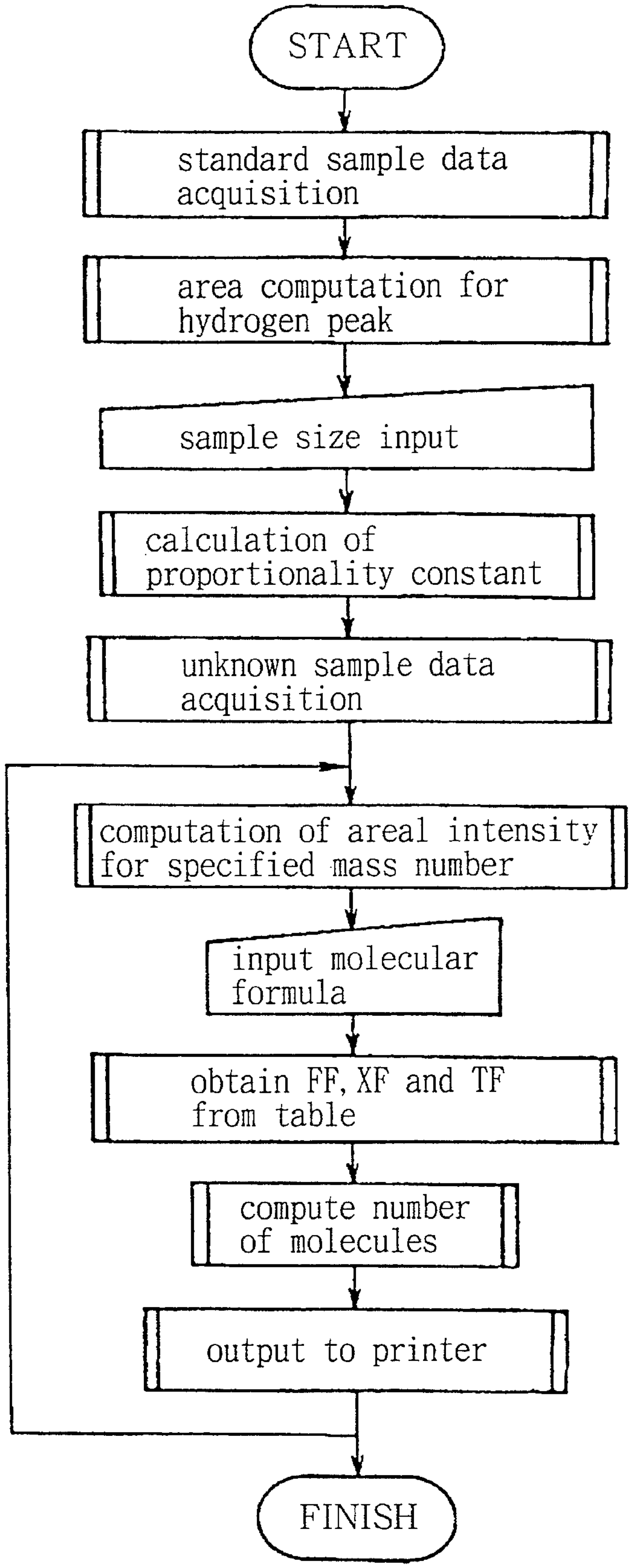
FIG. 4 is a flowchart showing the flow of the computation of the number of molecules by a device embodying this invention.
Figure 5:
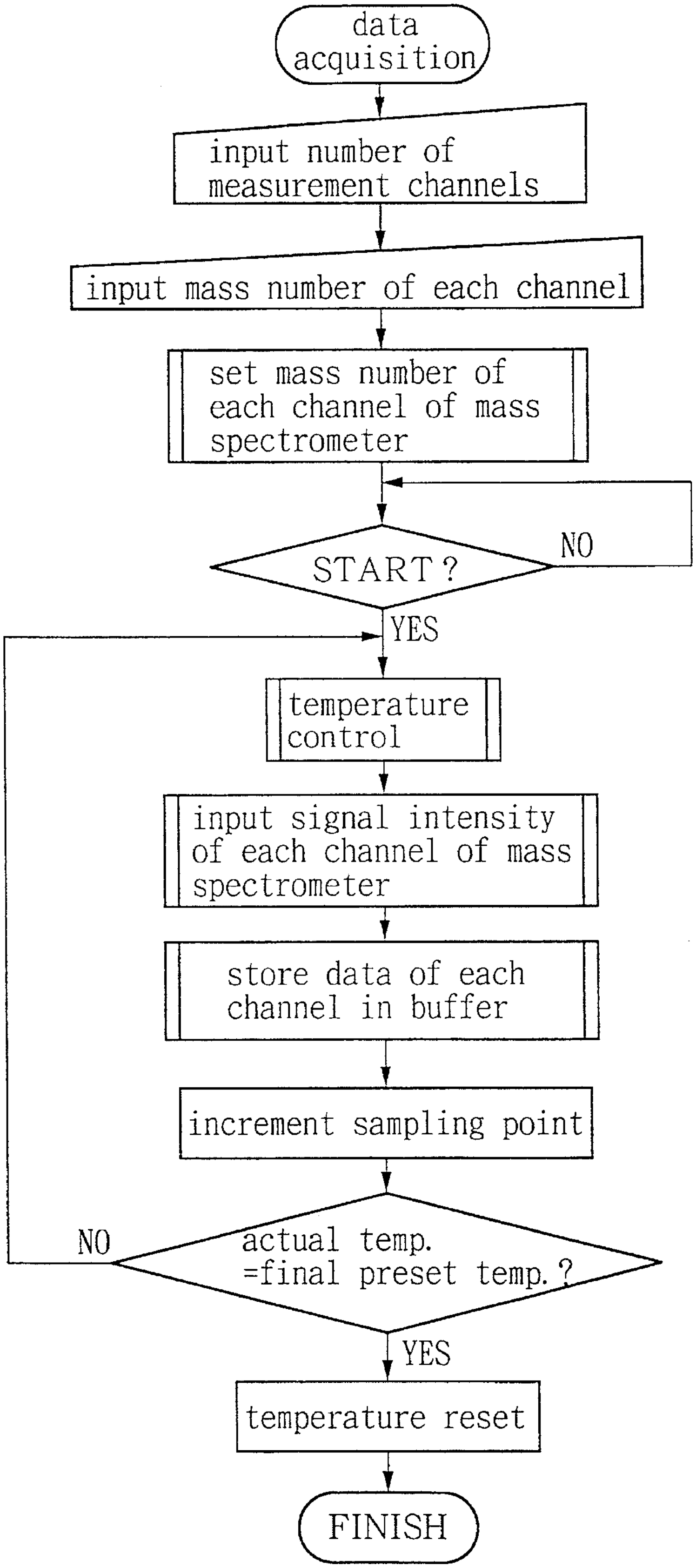
FIG. 5 is a flowchart showing the flow of the standard sample data acquisition and of the unknown sample data acquisition (which appear in FIG. 4) in an embodiment of this invention.
Figure 6:
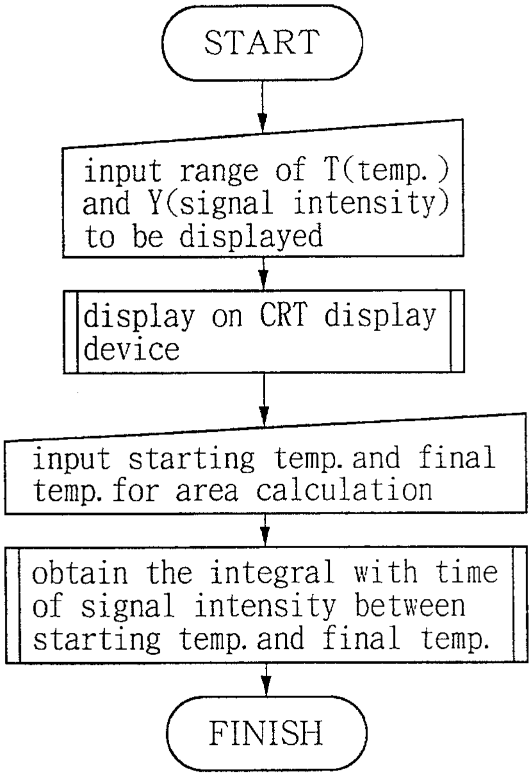
FIG. 6 is a flowchart showing the flow of the area computation by a device embodying this invention.
Figure 7:
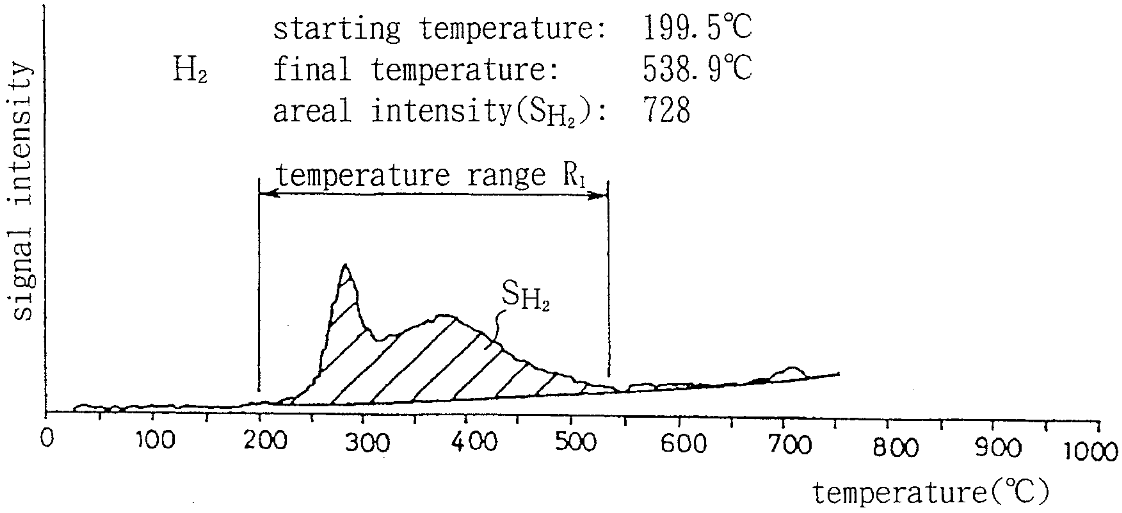
FIG. 7 shows an example of the areal intensity of $H_2$ obtained by means of a device embodying this invention.
Figure 8:
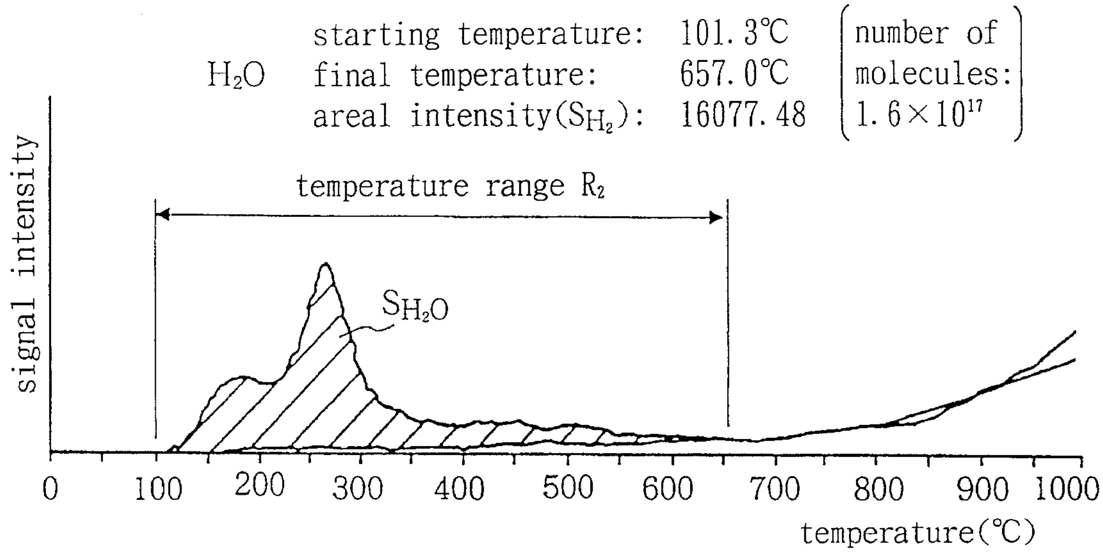
FIG. 8 shows an example of the areal intensity of $H_2O$ obtained by means of a device embodying this invention.
Figure 9:
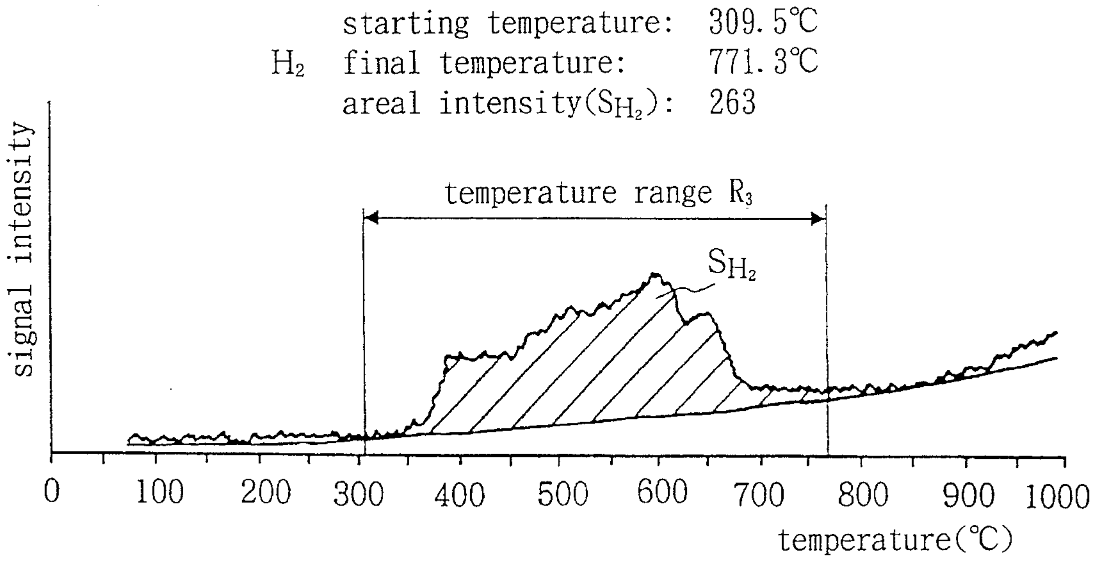
FIG. 9 shows an example of data obtained with another standard sample in an embodiment of this invention.

An explanation will now be given of the computation of the number of molecules of sample 3 by processing circuit 7. FIG. 4 is a flowchart showing the flow of the computation of the number of molecules by a device embodying this invention. FIG. 5 is a flowchart showing the flow of the standard sample data acquisition and of the unknown sample data acquisition (which appear in FIG. 4) in an embodiment of this invention. FIG. 6 is a flowchart showing the flow of the area computation by a device embodying this invention. FIG. 7 shows an example of the areal intensity of $H_2$ obtained by means of a device embodying this invention. FIG. 8 shows an example of the areal intensity of $H_2O$ obtained by means of a device embodying this invention. FIG. 9 shows an example of data obtained with another standard sample in an embodiment of this invention.

First of all, data for a standard sample are acquired as shown in FIG. 5. Namely, when the number of measurement channels and the mass number of each channel are input manually, processing circuit 7 will set the mass number of each channel of mass spectrometer 5 and carry out temperature control. Next, the signal intensity of each channel of mass spectrometer 5 is input, after which the sampling point is incremented and it is decided whether or not the actual temperature has reached the final preset temperature. If it has not reached the final preset temperature, temperature control is carried out again. The standard data are acquired by repeating the same processing until the actual temperature reaches the final preset temperature.

The computation of the number of molecules will now be explained with reference to FIG. 4, on the assumption that a silicon wafer with an area of A $cm^2$ has been prepared as the standard sample. Firstly, the prepared silicon wafer is etched with hydrofluoric acid at a concentration of several percent. It is known that this treatment results in an extremely stable coverage of hydrogen molecules on the silicon wafer, with $7\times10^{14}/cm^2$ on each of the front and back of the wafer. This has been confirmed from a variety of measurement results (see T. Takahagi, "*Evaluation of hydrogen-terminated Si surfaces*", Papers of Technical Meeting on Electronic Materials, Institute of Electrical Engineers of Japan, EFM-92-37). It will be assumed that all the $N_{H_2}=2\times 7\times10^{14}\times A$ hydrogen molecules which have been arranged on the surface by this etching treatment are desorbed by heating of the sort shown in FIG. 7. The doubling in this case is because the wafer has both a front and a back. In FIG. 7, temperature rise is plotted along the horizontal axis and the $H_2$ signal intensity detected by mass spectrometer 5 is plotted along the vertical axis. If the area $S_{H_2}$ of the shaded portion within temperature range $R_1$ shown in FIG. 7 is obtained, this area $S_{H_2}$ will be proportional to the total number of desorbed hydrogen molecules. The baseline which is gradually increased with temperature increasing is not the signal from the sample, because this increasing baseline is still observed without a sample. So, the area is decided for the shared portion with manually plotted baseline.

A proportionality constant K can now be obtained by means of the following equation after the measured size A $cm^2$ of the standard sample has been input:

$$K = N_{H_2}/S_{H_2} = 2\times7\times10^{14}\times A/S_{H_2} \quad (1)$$

Next, a sample to be measured is placed on sample stage 2 inside vacuum chamber 1 and an evacuated condition maintained by vacuum pump 1*a*.

Measurements are now made of the mass spectrometer signal obtained from the $H_2O$ gas desorbed from the sample to be measured. This is done while raising the sample temperature from room temperature to several hundred degrees centigrade, and while measuring the sample temperature with a thermocouple thermometer. An example of the result obtained by this measurement is shown in FIG. 8. It was found that valid measurements could be made up to a sample temperature of about 900° C., and that signal intensity became practically zero when a temperature of 650° C. was exceeded. It is inferred from this that all the $H_2O$ molecules were desorbed from the surface of this sample to be measured within the temperature range $R_2$.

If the area $S_{H_2O}$ of the diagonally shaded portion in FIG. 8 is obtained, it will be proportional to the total number of $H_2O$ molecules desorbed from the surface of this sample to be measured, and the constant of this proportionality will be the proportionality constant K obtained above.

Now, FIG. 8 is given as an easy-to-understand example, but when actual measurements are made, a plurality of substances with different mass numbers M can be measured in parallel by switching over the channel of mass spectrometer 5 while the temperature is gradually raised. For example, graphs for $H_2$ (M=2), $H_2O$ (M=18), $N_2$ (M=28), $CO_2$ (M=44) and so forth are obtained in the same way as the graph shown in FIG. 7. Areas $S_{H_2}$, $S_{H_2O}$, $S_{N_2}$, $S_{CO_2}$, and so forth are then computed for each substance. Next, the molecular formula for each substance is input. The number of molecules of each substance is then calculated from the aforementioned areas, the proportionality constant K defined in Equation 1, and a proportionality constant characteristic to each substance, this last being obtained from a table stored in processing circuit 7. In this connection, it may be mentioned that the total number of desorbed $H_2O$ molecules, as obtained from $S_{H_2O}$ which was in turn obtained from FIG. 8, was $1.6\times10^{17}$.

This can be generalized for a substance X of mass M as follows. The signal intensity $I_{XM}$ of this substance X at a partial pressure $PP_X$ inside the vacuum chamber of a quadrupole mass spectrometer will be:

$$I_{XM}=PP_X\times(FF_{XM}\times XF_X\times TF_M)\times K_S \quad (2)$$

where $FF_{XM}$ is the fragmentation factor, $XF_X$ is the ionization factor, $TF_M$ is the transmission factor of mass number M relative to mass number 28, and $K_S$ is a constant dependent on the applied voltage in the ion multiplier.

Area S of the data obtained in respect of number of molecules N on the sample surface will then be:

$$S=\int_0^t I\times M(t)dt = N\times(FF_{XM}\times XF_X\times TF_M)\times K_N \quad (3)$$

where $K_N$ is a proportionality constant.

In the case of hydrogen $H_2$:

$$S_{H_2}=N_{H_2}\times(FF_{XM}\times XF_X\times TF_M)_{H_2}\times K_N \quad (4)$$

In the case of molecule X:

$$S_X=N_X\times(FF_{XM}\times XF_X\times TF_M)_X\times K_N \quad (5)$$

Accordingly, from Equation 4 and Equation 5:

$$N_X = S_X\times\frac{N_{H_2}}{S_{H_2}}\times\frac{(FF_{XM}\times XF_X\times TF_M)_{H_2}}{(FF_{XM}\times XF_X\times TF_M)_X}$$

Using the proportionality constant K defined in Equation 1 gives:

$$N_X = K\times S_X\times\frac{(FF_{XM}\times XF_X\times TF_M)_{H_2}}{(FF_{XM}\times XF_X\times TF_M)_X} \quad (6)$$

and the number of molecules of molecule X can be calculated.

The value thereby obtained is output to printer 9.

As shown in FIG. 6, to perform the area computation, a graph of signal intensity is first of all displayed on CRT display device 8 by inputting the range of T (temperature) and Y (signal intensity) to be displayed. Next, by inputting the starting temperature and the finishing temperature for the area computation, area is obtained as the integral with time between the starting and finishing temperatures.

To give a concrete example, let us consider the computation for water $H_2O$:

for hydrogen $H_2$, XF=0.44, FF=0.98, TF=28/2=14 for water $H_2O$, XF=1.0, FF=0.75, TF=28/18=1.55 therefore:

$$\frac{(FF_{XM}\times XF_X\times TF_M)_{H_2}}{(FF_{XM}\times XF_X\times TF_M)_{H_2O}}=\frac{0.44\times0.98\times14}{1.0\times0.75\times1.55}=5.19$$

From the standard sample data shown in FIG. 7 (obtained using a hydrofluoric acid treated silicon wafer with an area of 1 $cm^2$), $S_{H_2}$ is 728, and therefore, using Equation 1:

$$\begin{aligned}K &= N_{H_2}/S_{H_2}\\ &= 2\times7\times10^{14}/728\\ &= 1.92\times10^{12}\end{aligned}$$

Since the areal intensity $S_{H_2O}$ for water $H_2O$ is 16077 in the concrete example shown in FIG. 8, the number of water $H_2O$ molecules, as obtained from Equation 6, is:

$$\begin{aligned}N_{H_2O} &= 1.92\times10^{12}\times16077\times5.19\\ &= 1.60\times10^{17}\end{aligned}$$

In practical measurements, even if load-lock chamber 15 is used for exchanging samples to be measured, the degree of vacuum decreases each time such an exchange is made and time is taken up in restoring the desired degree of vacuum. Measurements are therefore performed while changing over the mass number being measured by mass spectrometer 5 (i.e., by changing over the mass spectrometer channel), so that a multiplicity of results of the sort shown in FIG. 7 can be obtained at one time. The loop appearing in the flowchart shown in FIG. 4 indicates that processing is performed for all of a multiplicity of different substances. This enables the number of desorbed molecules of a multiplicity of substances to be measured at one time.

An explanation will now be given of another reference value. FIG. 9 is an example of the results of measurement of a silicon wafer implanted with $1\times10^{15}$ hydrogen ions per 1 $cm^2$ tinder an accelerating voltage of 40 kV. The size of this silicon wafer corresponds to an area of 1 $cm^2$. Because it is hydrogen molecules that have been detected by this mass spectrometer, the quantity of hydrogen molecules desorbed from the standard sample will be $5\times10^{14}$ (half of the quantity of hydrogen ions implanted). The temperature range $R_3$ has been taken as 309.5° C.–771.3° C. The aforementioned proportionality constant K is therefore given by:

$$\begin{aligned}K &= 5\times10^{14}/263\\ &= 1.90\times10^{12}\end{aligned}$$

which agrees with the value explained in the previous example.

As described above, a silicon wafer which has been surface-treated with hydrofluoric acid is used as a standard sample. In this invention, however, another wafer where the number of molecules per $cm^2$ is known (for example, a wafer implanted with $1\times10^{15}$ hydrogen ions) can also be used as the standard sample.

Feasibility of industrial utilization

As has been explained above, according to this invention, the signal intensity for each kind of gas desorbed from a sample is displayed graphically as a function of temperature (or of elapsed time) up to the point where hardly any gas desorbs from the sample, and these signal intensities are integrated, thereby enabling the number of molecules of each kind of desorbed gas to be measured.

If this device is utilized to evaluate semiconductor IC production processes, it will be possible to learn what quantities of unwanted substances have adsorbed onto the circuit substrate in the course of the processes, and to increase production yield.

I claim:

1. A thermal desorption gas spectrometer comprising:

a vacuum chamber;

a vacuum pump which maintains said vacuum chamber at a vacuum;

a sample stage positioned within said vacuum chamber;

a heater which heats a sample placed on said sample stage;

a mass spectrometer positioned within said vacuum chamber to detect gas which desorbs from said sample; and a processing circuit which receives an electrical signal output by said mass spectrometer, said processing circuit including:

recording means which continuously records, for each mass of a detected substance, an intensity of said electrical signal as a function of at least one of temperature and elapsed time from a start of heating of said sample to a temperature at which an amount of desorbed gas from said sample becomes extremely small; and integration means which integrates said intensity of said electrical signal with respect to said function of said at least one of temperature and elapsed time for each mass of said detected substance, and which displays a number of molecules of said detected substances which have adsorbed onto a surface of said sample based on a ratio of said integration of said intensity of said electrical signal to a reference value.

2. A thermal desorption gas spectrometer according to claim 1, wherein:

said reference value is an integration of said intensity of said electrical signal corresponding to a number of hydrogen molecules which desorb from a silicon wafer which has been surface-treated with hydrofluoric acid.

3. A thermal desorption gas spectrometer according to claim 1, wherein:

said reference value is an integration of said intensity of said electrical signal corresponding to a number of hydrogen molecules which desorb from a silicon wafer which has been implanted with hydrogen ions.

4. A thermal desorption gas spectrometer according to claim 1, further comprising:

baseline determination means for determining a baseline of said intensity of said electrical signal without said sample;

said means for integrating performing an integration between said intensity of said electrical signal with said sample and said baseline of said intensity of said electrical signal without said sample with respect to said function of said at least one of temperature and elapsed time for each mass of said detected substance.

5. A thermal desorption gas spectrometer according to claim 1, wherein said heater includes an infrared source, said sample being heated by infrared rays radiated from said infrared source.

6. A thermal desorption gas spectrometer comprising:

a vacuum chamber;

a vacuum pump which maintains said vacuum chamber at a vacuum;

a sample stage positioned within said vacuum chamber;

a heater which heats a sample placed on said sample stage;

a mass spectrometer to detect gas which desorbs from said sample; and a processing circuit which receives an electrical signal output by said mass spectrometer, said processing circuit including:

recording means which records, for each mass of a detected substance, an intensity of said electrical signal as a function of at least one of temperature and elapsed time from a start of heating of said sample to a temperature at which an amount of desorbed gas from said sample becomes extremely small; and integration means which integrates said intensity of said electrical signal with respect to said function of said at least one of temperature and elapsed time for each mass of said detected substance to provide a number of molecules of said detected substances which have adsorbed onto a surface of said sample based on a ratio of said integration of said intensity of said electrical signal to a reference value.

7. A thermal desorption gas spectrometer according to claim 6, further comprising:

baseline determination means for determining a baseline of said intensity of said electrical signal without said sample;

said means for integrating performing an integration between said intensity of said electrical signal with said sample and said baseline of said intensity of said electrical signal without said sample with respect to said function of said at least one of temperature and elapsed time for each mass of said detected substance.

8. A thermal desorption gas spectrometer according to claim 7, wherein:

said reference value is an integration of said intensity of said electrical signal corresponding to a number of hydrogen molecules which desorb from a silicon wafer which has been surface-treated with hydrofluoric acid.

9. A thermal desorption gas spectrometer according to claim 7, wherein:

said reference value is an integration of said intensity of said electrical signal corresponding to a number of hydrogen molecules which desorb from a silicon wafer which has been implanted with hydrogen ions.

10. A thermal desorption gas spectrometer according to claim 7, wherein said heater includes an infrared source, said sample being heated by infrared rays radiated from said infrared source.

* * * * *